United States Patent Office 3,699,070
Patented Oct. 17, 1972

3,699,070
EPOXY COMPOSITIONS FLEXIBILIZED WITH HYDROXYL-TERMINATED POLYMERS OF CYCLIC ESTERS
John Wynstra, Somerville, and John Joseph Stevens, Jr., Highland Park, N.J., assignors to Union Carbide Corporation, New York, N.Y.
No Drawing. Filed July 17, 1969, Ser. No. 842,730
Int. Cl. C08g 51/34
U.S. Cl. 260—31.4 EP
18 Claims

ABSTRACT OF THE DISCLOSURE

Curable compositions for insulating use, the cured products having a high degree of flexibility and superior weathering characteristics. These curable compositions comprise a polyepoxide, a curing agent therefor, and a hydroxyl-terminated polymer of a cyclic ester. The curable compositions may advantageously also contain a lactone to provide a higher degree of flexibility in the cured product.

BACKGROUND OF THE INVENTION

Field of the invention

This invention relates to curable compositions which upon curing exhibit superior electrical insulating and weather resistant properties. More particularly, this invention relates to curable polyepoxide compositions which can be cured to provide products exhibiting good low temperature toughness, for use in electrical insulating applications.

Description of the prior art

A major problem in the use of organic materials as insulating components for electrical equipment used in outdoor installations is the deterioration of the insulating component due to weather conditions. Such deterioration results in loss of insulating properties and thus has made their use as insulating components impractical. Because of this disadvantage, organic insulating components are frequently avoided in the construction of insulators and other electrical equipment where such components would be subjected to severe weather conditions, even though these components would otherwise be commercially attractive.

Curable organic systems which have been considered for insulating end uses includes polymerized resins based on a diepoxide, a curing agent including a curing catalyst and/or an organic hardener, and a diluent. The purpose of the diluent may be to adjust and control the flexibility of the resulting resin. Generally the diluents also reduce the viscosity of the diepoxide so that better penetration in casting and wetting ability in laminate and adhesion formulation may be achieved. Additionally, the reduction of viscosity obtained with such diluents makes the resins much easier to handle from a manufacturing point of view. The diluents that have generally been employed commercially include reactive materials containing epoxy or hydroxyl groups, e.g., polyols, mono epoxides, and lactones. Patents disclosing the use of lactone diluents include U.S. Pats. 3,203,920, 3,222,312 and 3,294,743.

While the diluents and flexibilizers described above have proven to be highly advantageous, they present a rather difficult problem when used in applications requiring good weather resistance. In particular, the diluents severely reduce the weather resistance and, after aging, the low temperature toughness of the insualting composition, thereby precluding their use.

SUMMARY OF THE INVENTION

We have discovered that by using a hydroxyl-terminated polymer of a cyclic ester as a flexibilizing modifier or diluent in the preparation of a cured polyepoxide, products having superior weather resistance, low temperature toughness, and still having the range of flexibilities generally obtained with prior art diluents, can be obtained. More specifically, we have discovered a curable composition which has superior weathering characteristics as compared with prior art compositions, this composition comprising a mixture of (1) a polyepoxide, preferably having oxirane oxygens bonded to cycloaliphatic carbon atoms; (2) a polycarboxylic acid anhydride; (3) a hydroxyl-terminated polymer of a cyclic ester, this polvmer being defined by the general formula:

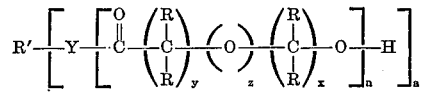

wherein R' is an aliphatic, cycloaliphatic, aromatic, or heterocyclic organic radical; Y is —O—, —S—, —NH—, or NR" bonded directly to carbon of R', wherein R" is an alkyl, aryl, aralkyl, or cycloalkyl radical; each R, individually, is hydroen, alkyl, halogen, or alkoxy; $x$ and $y$ are each integers from 1 to 4; $z$ is either zero or 1; the sum of $x+y+z$ is not less than 4 and not greater than 6; the total number of R variables which are substituents other than hydrogen is not greater than 3; $a$ is at least 2; each $n$ is either zero or an integer, but at least one $n$ is not zero; and the multiple of $a \cdot n$ is less than 100; and desirably (4) a curing catalyst.

We have also discovered that when there is additionally incorporated into the foregoing curable composition a lactone monomer, the flexibility of the cured product is further increased.

DESCRIPTION OF THE PREFERRED EMBODIMENTS

We have discovered a curable composition which when cured results in a product highly suitable for use in high voltage electrical insulating products, and which has both improved flexibility and excellent weather resistance as compared to prior art products. This curable composition comprises a mixture of (1) a polyepoxide, (2) a polycarboxylic acid anhydride, (3) a polymer of a cyclic ester, and desirably (4) a curing catalyst.

The polyepoxide materials which are contemplated are those which have more than one vicinal epoxy group, i.e., more than one

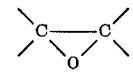

group, which group may be in a terminal position, i.e., a

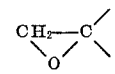

group, or in an internal position, i.e., a

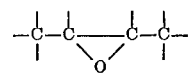

group. The polyepoxides may be aliphatic, cycloaliphatic, aromatic, or heterocyclic, and may be substituted with substituents such as hydroxyl, alkyl, alkoxy, ester, acetal, ether, etc.

Preferred polyepoxides that are highly desirable include those which contain at least one oxirane oxygen atom bonded to two vicinal cycloaliphatic carbon atoms. In different language, the polyepoxide component contains at least one vicinal epoxy group, i.e.,

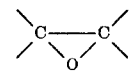

the carbon atoms of which form a portion of a cycloaliphatic hydrocarbon nucleus. The cycloaliphatic nucleus preferably contains from 5 to 7 carbon atoms including

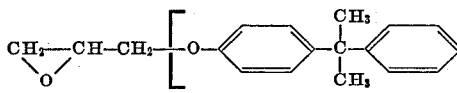

the epoxy carbon atoms. Saturated polyepoxides which contain all of the oxirane oxygen atoms bonded to vicinal cycloaliphatic carbon atoms are preferred. Of course, it is readily apparent to epoxy chemists that only one oxirane oxygen can be chemically bonded to any pair of vicinal or adjacent carbon atoms. Saturated diepoxides which contain both oxirane oxygen atoms bonded to cycloaliphatic carbon atoms are highly preferred. Polyepoxides which contain solely carbon, hydrogen, and oxygen atoms are especially preferred. The oxygen atoms can be (in addition to oxirane oxygen) etheric oxygen, i.e., —O—; oxygen present in an ester group, i.e.,

oxygen present in a carbonyl group, i.e.,

and the like.

Illustrative polyepoxides contemplated include, for instance,
bis(3,4-epoxycyclohexylmethyl) oxalate,
bis(3,4-epoxycyclohexylmethyl) malonate,
bis(3,4-epoxycyclohexylmethyl) succinate,
bis(3,4-epoxycyclohexylmethyl) glutarate,
bis(3,4-epoxycyclohexylmethyl) adipate,
bis(3,4-epoxycyclohexylmethyl) tetrahydrophthalate,
bis(3,4-epoxycyclohexylmethyl) hexahydrophthalate,
bis(3,4-epoxycyclohexylmethyl) phthalate,
3,4-epoxycyclohexylmethyl 3,4-epoxycyclohexanecarboxylate,
6-methyl-3,4-epoxycyclohexylmethyl 6-methyl-3,4-epoxycyclohexanecarboxylate,
2-ethyl-3,4-epoxycyclohexylmethyl 2-ethyl-3,4-epoxycyclohexanecarboxylate,
1-chloro-3,4-epoxycyclohexylmethyl 1-chloro-3,4-epoxycyclohexanecarboxylate,
2-bromo-3,4-epoxycyclohexylmethyl 2-bromo-3,4-epoxycyclohexanecarboxylate,
4-vinylcyclohexene dioxide, dicyclopentadiene dioxide, and the like.

Further preferred polyepoxides can be illustrated by specific reference to 3,4-epoxycyclohexylmethyl 3,4-epoxycyclohexane carboxylate, 4-vinylcyclohexene dioxide, bis(6-methyl-3,4-epoxycyclohexylmethyl) adipate, and the like.

Other suitable polyepoxides include glycidyl esters, e.g., the diglycidyl esters of methyltetrahydrophthalic acid and hexahydrophthalic acid, and epoxycyclohexyl acetals.

Other polyepoxides which are suitable in the practice of the invention include, for example, the vicinal epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or poly-nuclear phenols such as 2,2-bis(4-hydroxyphenyl)propane (bisphenol-A), 2,2-bis(4-hydroxyphenyl)butane, 4,4'-dihydroxybenzophenone, bis(4-hydroxyphenyl)ethane, 2,2-bis(4-hydroxyphenyl) pentane and 1,5-dihydroxynaphthalene. The halogen-containing epoxides may be further exemplified by epichlorohydrin, 3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. Pat. 2,633,458.

Thus, one contemplated class of polyepoxides is the diglycidyl polyethers of dihydric phenols, especially those which have the following formula:

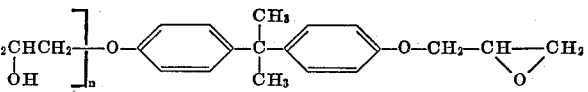

wherein $n$ has a value from zero to about 10, preferably from 0 to about 2.

The polycarboxylic acid anhydrides used in curing the polyepoxide include any and all anhydrides whether aliphatic, aromatic or cycloaliphatic in nature. The preferred anhydrides are the dicarboxylic acid anhydrides and preferably the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, glutaric anhydride, adipic anhydride, succinic anhydride, itaconic anhydride, heptylsuccinic anhydride, hexylsuccinic anhyride, methylbutylsuccinic anhydride, methyltetrahydrophthalic anhydride, n-nonenylsuccinic anhydride, octenylsuccinic anhydride, pentenylsuccinic anhydride, propylsuccinic anhydride, citraconic anhydride, 4 - nitrophthalic anhydride, 1,2 - naphthalic anhydride, 2,3 - naphthalic anhydride, 1,8 - naphthalic anhydride, tetrabromophthalic anhydride, tetraiodophthalic anhydride, and the like.

Mixtures of anhydrides, polymeric anhydrides or mixed polymeric anhydrides of sebacic, adipic, pimelic, cyclohexane, 1,4 - dicarboxylic, terephthalic and isophthalic acids are also suitable. Polycarboxylic acid anhydrides, such as 1,2,4,5 - benzenetetracarboxylic dianhydride and 1,5 - dimethyl - 2,3,4,6,7,8 - hexahydronaphthalene-3,4,-7,8 - tetracarboxylic dianhydride can also be used.

The curing catalyst that may be employed are well known and include metal and non-metal halide Lewis acids, tertiary amines, fatty acid acylates of group IV-B metals, organotin compounds having at least one Sn-C bond, and carboxylic acid salts of lead and manganese. Numerous examples of such catalysts may be found in the art. See, e.g., U.S. Pats. 2,878,234 and 2,890,208.

Particularly useful are heavy metal salts of organic acids. Typical of the organic acid salts are stannous diacylates, particularly stannous dialkanoates, stannic acylates, particularly stannic tetraalkanoates, dialkyltin oxides, such as dibutyltin oxide, dialkyltin dialkanoates, such as dibutyltin dilaurate, tetraalkyltin, lead alkanoate, manganese alkanoate and stannous octoate.

Suitable anmines include pyridine, triethylene diamine, benzyldimethylamine, piperidine, t-butylamine, diethanolamine, aniline and dimethylaminomethylphenol.

The amount of curing catalyst employed is not narrowly critical. Thus, the catalyst amount may vary from about 0.1 to about 10 percent by weight of the total organic components, and preferably from about 0.5 to about 5 percent by weight.

The flexibilizers used in our invention comprise polymers of cyclic esters. These polymers are hydroxyl-terminated and are further characterized by the general formula:

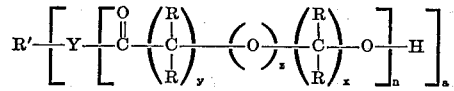

wherein R' is an aliphatic, cycloaliphatic, aromatic, or heterocyclic radical; Y is —O—, —S—, —NH—, or NR", wherein R" is an alkyl, aryl, aralkyl, or cycloalkyl radical; each R, individually, is hydrogen, alkyl, halogen, or alkoxy; $x$ and $y$ are each integers from 1 to 4; $z$ is either zero or 1; the sum of $x+y+z$ is not less than 4 and not greater than 6; the total number of R variables which are substituents other than hydrogen is not greater than 3 and preferably is not greater than 2; $a$ is at least 2;

each $n$ is either zero or an integer, but at least one $n$ is not zero; and the multiple of $a \cdot n$ is less than 100.

Illustrative R variables include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the R substituents does not exceed eight.

The recurring linear unit

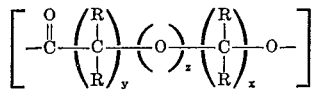

derived from the opening of the lactone ring, is interconnected through the oxy group (—O—) of one unit with the carbonyl group

of a second unit. In different language, the interconnection of these units does not involve the direct bonding of two carbonyl groups, i.e.,

For ease of handling, the viscosity of the system (polyepoxide, anhydride, and hydroxyl-terminated cyclic ester polymer) should not be too high. Thus, although theoretically a hydroxyl-terminated cyclic ester polymer of virtually any molecular weight would be suitable, practical considerations dictate that its molecular weight not be in excess of about 10,000, and desirably not in excess of about 5000.

Particularly preferred hydroxyl-terminated polymers of cyclic esters are those which are characterized by the oxypentamethylenecarbonyl chain, as seen in the recurring structural unit:

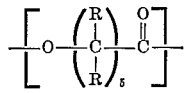

wherein each R is hydrogen or lower alkyl, preferably hydrogen or methyl, with the proviso that no more than three R variables are substituents other than hydrogen.

The preparation of the hydroxyl-terminated cyclic ester polymers is well documented in the patent literature as exemplified by U.S. Pats. Nos. 2,878,236; 2,890,208; 3,169,945; and 3,284,417. Briefly, the process involves the polymerization of an admixture containing at least one cyclic ester monomer with a functional initiator therefor, and a suitable catalyst.

Suitable monomeric cyclic esters which can be employed in the manufacture of the cyclic ester polymers are best illustrated by the following formula:

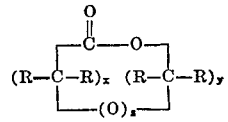

wherein the R, $x$, $y$, and $z$ variable have the significance noted previously.

Representative monomeric cyclic esters which are contemplated include, for example, delta-valerolactone; epsiloncaprolactone; zeta-enantholactone; the monoalkyl-delta-valerolactones, e.g., the monomethyl-, monoethyl-, monohexyl-delta-valerolactones, and the like; the dialkyl-delta-valerolactones, e.g., the dimethyl-, diethyl-, and di-n-octyl-delta-valerolactones, and the like; the monoalkyl-dialkyl-, and tri-alkyl-epsilon-caprolactones, e.g., the monomethyl-, monoethyl-, monohexyl-, dimethyl-, diethyl-, di-n-propyl, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., the monomethoxy-, monoisopropoxy-, dimethoxy-, and diethoxy-delta-valerolactones and epsilon-caprolactones, and the like; 1,4-dioxane-2-one; and the like. A single cyclic ester monomer or mixtures of such monomers may be employed.

In employing an admixture containing cyclic ester monomer and polyfunctional initiator which possesses at least two active hydrogen substituents, e.g., amino, hydroxyl, or mercapto, it is desirable to use the catalysts noted in U.S. Pats. Nos. 2,878,236, 2,890,208, 3,169,945, and 3,284,417 under the operative conditions discussed therein. In these processes the active hydrogen substituent on the initiator is capable of opening the cyclic ester monomer ring whereby said cyclic ester is added to said initiator as a substantially linear group. As noted, the resulting cyclic ester polymer contains terminal hydroxy groups. The molecular weight of the resulting hydroxyl-terminated cyclic ester polymers can be predetermined by controlling the molar ratios of cyclic ester monomer to be added to the functional initiator. As noted, amino, hydroxyl, and mercapto substituents on the initiator result in polymeric products having hydroxyl end-groups. The polyfunctional initiators are those having at least two reactive hydrogens that are capable of opening a lactone ring. Typical among compounds useful as such are polyfunctional alcohols, amines, mercaptans, phenols, amino alcohols and mercapto alcohols. The initiator may be represented by the formula:

$$R'(YH)_a$$

in which $R'$ is an aliphatic, cycloaliphatic, aromatic or heterocyclic radical; $a$, the degree of functionality of the initiator, is at least two; and Y's are —O—, —S—, —NH— or —NR''—, R'' being an alkyl aryl, aralkyl or cycloalkyl radical. Diols and polyols of higher functionality are preferred.

Representative bifunctional compounds that are suitable include aliphatic diols such as glycols of the general formula $HO(CH_2)_bOH$ in which $b$ equals two to ten, alkylene ether glycols of the formulae $HO[CH_2)_cO]_dH$ and $HO[CH(CH_3)CH_2O]_dH$ in which $c$ is from two to five and $d$ is one to about ten, 2,2-dimethyl-1,3-propanediol, 2,2-diethyl-1,3-propanediol, 3-methyl-1,5-pentanediol, N-methyl- and N-ethyl diethanolamines; cycloaliphatic diols such as various cyclohexanediols, 4,4'-methylenebiscyclohexanol, 4,4'-isopropylidenebiscyclohexanol; aromatic diols such as hydroquinol; aromatic-aliphatic diols such as various xylenediols, hydroxymethylphenethyl alcohols, hydroxymethyl-phenylpropanols, phenylene-diethanols, phenylene-dipropanols; and various heterocyclic diols such as 1,4-piperazine diethanol; difunctional amino alcohols such as aliphatic amino alcohols of the general formula $HO(CH_2)_eNH_2$, where $e$ equals 2 to 10, N-methylethanolamine, isopropanolamine, N-methylisopropanolamine; aromatic amino alcohols such as para-aminophenethyl alcohol and para-amino-alpha-methyl-benzyl alcohol; various cycloaliphatic amino alcohols such as 4-aminocyclohexanol; diamines of the general formula $H_2N(CH_2)_fNH_2$, monosecondary diamines of the general formula $R'''NH(CH_2)_fNH_2$, and disecondary diamines of the general formula

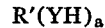

where $f$ equals 2 to 10 and where $R'''$ is alkyl, aryl, aralkyl or cycloalkyl; aromatic diamines such as meta-phenylenediamine, para-phenylenediamine, toluene-2,4-diamine, toluene-2,6-diamine, 1,5-naphthalenediamine, 1,8-naphthalenediamine, meta-xylyenediamine, para-xylyl-enediamine, benzidine, 3,3'-dimethyl-4,4'-biphenyldiamine, 3,3'-dimethoxy-4,4'-biphenyldiamine, 3,3'-dichloro-4,4'-biphenyldiamine, 4,4'-methylenedianiline, 4,4'-ethylenedianiline, 2,3,5,6-tetramethyl-para-phenylenediamine, 2,5-fluorenediamine, and 2,7-fluorenediamine; and cycloaliphatic diamines such as 1,4-cyclohexanediamine, 4,4'-methylenebiscyclohexylamine, and 4,4'-isopropylidenebiscyclohexylamine; and heterocyclic amines such as piperazine, 2,5-dimethylpiperazine, and 1,4-bis(3-aminopropyl)piperazine, as well as corresponding dithiols, thioalcohols and thioamines.

Higher functional compounds, i.e., where $a$ is three or more, are useful in forming branched carbooxyalkylene polymers and include higher functional polyols such as glycerol, trimethylolethane, trimethylolpropane, 1,2,4-butanetriol, 1,2,6-hexanetriol, N-triethanolamine, N-triisopropanolamine, erythritol, pentaerythritol, N,N,N',N'-tetra(2-hydroxyethyl)ethylenediamine, dipentaerythritol, sorbitol, alkyl glycosides, and carbohydrates such as glucose, sucrose, starch, and cellulose; amino alcohols such as diethanolamine, diisopropanolamine, 2-(3-aminoethylamino)ethanol, 2-amino - 2(hydroxymethyl)-1,3-propanediol, and 2-amino-2-methyl-1,3-propanediol; and higher functional polyamines such as diethylenetriamine, triethylenetetramine, tetraethylenepentamine, diisopropylenetriamine, 1,2,5-benzenetriamine, toluene-2,4,6-triamine 4,4',4'-tris(p-aminophenyl)methane, and polyamines obtained by interaction of aromatic monoamines with formaldehyde or other aldehydes, for example:

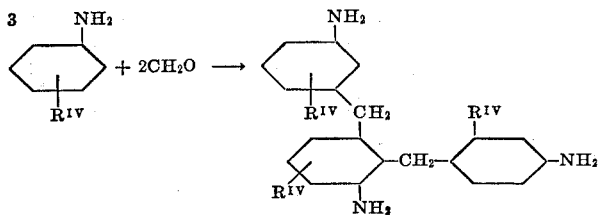

and other reaction products of the above general type, where $R^{IV}$ is H or alkyl.

From the foregoing, it will be seen that the reaction between the polyfunctional initiator, $R'(YH)_a$, and the cyclic ester,

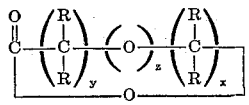

may be illustrated as follows:

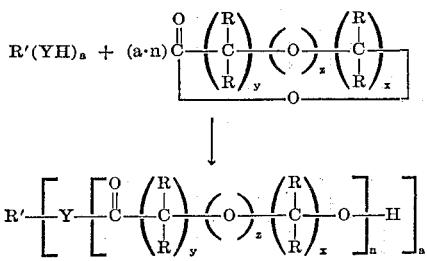

wherein R' is an aliphatic, cycloaliphatic, aromatic, or heterocyclic radical; Y is —O—, —S—, —NH—, or NR" bonded directly to carbon of R', wherein R" is an alkyl, aryl, aralkyl, or cycloalkyl radical; each R, individually, is hydrogen, alkyl, halogen, or alkoxy; $x$ and $y$ are each integers from 1 to 4; $z$ is either zero or 1; the sum of $x+y+z$ is not less than 4 and not greater than 6; the total number of R variables which are substituents other than hydrogen is not greater than 3 and preferably is not greater than 2; $a$ is at least 2 and preferably is from about 2 to 10; each $n$ is either zero or an integer, but at least one $n$ is not zero; and the multiple of $a \cdot n$ is less than 100.

It is frequently desirable to include a filler in the foregoing curable composition. Typical fillers include hydrated alumina, hydrated magnesia, zircon, asbestos, mica, barytes, limestone, siliceous fillers such as silica and the silicates, etc. A preferred filler is alumina trihydrate.

The relative proportions as between the filler and curable composition may vary widely. Generally, the filler will comprise from about 10 to 80 percent by weight of the over-all filled composition although higher or lower amounts occasionaly may be employed. A more preferred range for the filler is from about 20 to about 70 percent by weight of the over-all filled composition, with the most preferred range being from about 40 to 65 percent by weight.

The incorporation of the desired filler into the curable composition is generally accomplished by simple blending. Thereafter, the resulting filled composition can be formed by any of the usual techniques well known in the art, e.g., casting, molding, impregnating, dipping, encapsulating, etc.

The novel curable compositions of our invention can be prepared by mixing the polyepoxide with the hydroxyl-terminated cyclic ester polymer, anhydride, and curing catalyst. In preparing homogeneous compositions it is advantageous to employ a temperature as high as the melting point of that component of the mixture which has the highest melting point. Stirring the components also aids in formation of a homogeneous composition which is in the form of a liquid solution.

The liquid solution is reacted to a solid state ("gel"), desirably at a temperature of from about 60 to about 125° C. Further curing is generally effected at a higher temperature, generally at from about 100 to about 250° C. The time for effecting a complete cure can be from several minutes to several hours depending on the temperature employed as well as upon the nature and relative amounts of materials used.

In accordance with a further aspect of our invention, we have found that by adding a lactone, desirably epsilon caprolactone, epsilon - methyl - epsilon - caplactone, zeta-enantholactone, eta-caprylolactone, 2-keto-1,4-dioxane, or mixtures thereof, to the heretofore described curable composition, the flexibility of the resulting cured product is further increased while still maintaining the superior weathering characteristics.

We have also determined that for a curable composition comprising a polyepoxide, an anhydride, a hydroxyl-terminated polymer of a cyclic ester, and a lactone, flexibility of the composition may be optimized by reference to the following three parameters:

(1) FLEXIBILIZER CONTENT

This is defined as the weight percent of hydroxyl-terminated cyclic ester polymer plus lactone, based on the total organic content (hydroxyl-terminated cyclic ester polymer plus lactone plus polyepoxide plus anhydride) of the curable mixture. The value selected determines the stiffness of the cured product. The flexibilizer content should generally be from about 1 to 80 percent by weight, based on the total organic content. For flexible products the flexibilizer content is preferably in the range from about 50 percent to about 80 percent by weight of the total organic content. A flexibilizer content in excess of about 80 percent leads to longer gel times and incomplete cure. For cured products that are less flexible and may be characterized as semi-rigid, the flexibilizer content should be from about 25 up to about 50 percent by weight of the total organic content. For cured products that are characterized by rigidity and toughness, the flexibilizer content should be from about 1 to 25 percent by weight of the total organic content.

(2) ANHYDRIDE/EPOXIDE RATIO

This value is the ratio of the number of anhydride groups to the number of epoxide groups. The specific value of this ratio will depend on the selection of the curing catalyst employed. Generally, values for this ratio desirably fall in the range of from about 0.1 to about 1.5, and preferably from about 0.4 to 1.0. For a stannous octoate-promoted cure, an anhydride/epoxide ratio of about 0.4 is preferred. For a benzyldimethylamine promoted cure the anhydride/epoxide ratio is most preferably about 0.9.

Any anhydride/epoxide ratio of less than 1 (i.e., less than stoichiometric), is a recognition of the competing process of etherification, that is, hydroxide/epoxide reaction, which accompanies the copolymerization process of esterification, i.e. carboxyl/epoxide reaction.

(3) ANHYDRIDE/HYDROXYL RATIO

We have found that the toughness of the product is a function of the anhydride/hydroxyl ratio. Too low a ratio results in poor toughness while too high a ratio gives a poor rate of cure. This latter effect results from the fact that an anhydride reacts with an epoxide only in the presence of an hydroxyl or other active hydrogen source.

The preferred range for the ratio of anhydride groups to hydroxyl groups, regardless of the flexibilizer content or the anhydride/epoxide ratio, is from about 0.5 to about 20 with the more preferred range being about 2 to about 10.

Thus, taken together, the anhydride/epoxide ratio and anhydride/hydroxyl ratio insure that conversion to a well cured tough product will result after an appropriate curing cycle. The flexibilizer content will determine the degree of stiffness of the product. Optimum values for each of these control parameters depend on the character of the specific components used and the end use properties required, and are readily determined by routine experiment.

The compositions of this invention have been described above in terms of ratios of epoxide, anhydride and hydroxyl groups. By the term "epoxide group," as used herein, is meant the group

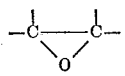

By the term "anhydride group" is meant the group

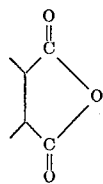

By the term "hydroxyl group" is meant the group

For example, one mol of 3,4-epoxy-6-methylcyclohexylmethyl 3,4 - epoxy - 6 - methylcyclohexanecarboxylate contains two epoxy groups; a hydroxyl-terminated cyclic ester polymer obtained by polymerizing epsilon-caprolactone with a dihydric alcohol, HO—R—OH, contains two hydroxyl groups; and hexahydrophthalic anhydride contains one anhydride group.

We have determined that for a curable composition of diepoxide/hydroxyl-terminated anhydride/cyclic ester polymer, which composition may additionally contain a lactone, said composition having a flexibilizer content S, an anhydride/epoxide ratio $R_1$ and an anhydride/hydroxyl ratio $R_2$, the preferred amounts of each component may be determined from the following expressions:

(1) $\quad A = (100-S)R_1X/(Y+R_1X)$
(2) $\quad C = S - WR_1(100-S)/[R_2N(Y+R_1X)]$
(3) $\quad E = (100-S)Y/(Y+R_1X)$
(4) $\quad M = WR_1(100-S)/[R_2N(Y+R_1X)]$ wherein:

A = grams of anhydride $S = $ flexibilizer content $= \dfrac{100(M+C)}{M+A+E+C}$ $R_1 = $ anhydride/epoxide ratio $= \dfrac{A/X}{E/Y} = \dfrac{AY}{EX}$ X = molecular weight of anhydride Y = equivalent weight of diepoxide $= \dfrac{\text{molecular weight of diepoxide}}{2}$ C = grams of lactone W = molecular weight of hydroxyl-terminated cyclic ester polymer $R_2 = $ anhydride/hydroxyl ratio $= \dfrac{A/X}{N \cdot M/W} = \dfrac{AW}{N \cdot M \cdot X}$ N = hydroxyl functionality of hydroxyl-terminated cyclic ester polymer E = grams of a diepoxide M = grams of hydroxyl-terminated cyclic ester polymer $M+A+E+C=100$ Of course, for polyepoxides other than diepoxides or for anhydrides other than those of dicarboxylic acids, different sets of equations would be derived.

Where the flexiblizer includes epsilon-caprolactone, we have noted that as the concentration of the flexibilizer in the mixture increases, increased flexibility of the cured product is obtained. However, at epsilon-caprolactone concentrations above 70 percent by weight (based on total organic content), crystallization of the cured product may take place after the product has stood for a period of time at room temperature, so that products which initially are quite flexible may become relatively hard and rigid. We have discovered that by substituting a methyl-substituted caprolactone for a portion of the epsilon-caprolactone, any tendency towards crystallization can be prevented. Thus, we have found that a lactone mixture of a major proportion of epsilon-caprolactone and a minor proportion of epsilon-methyl-epsilon-caprolactone, and preferably containing from about 10% to about 25% by weight epsilon-methyl-epsilon caprolactone, completely prevent any increase in stiffness, even at 80% flexibilizer levels.

The following examples will further illustrate our invention. All parts are by weight unless otherwise stated. In each of the following tables included herein, the designation of the components of each composition is as follows:

ERL–4221: 3,4 - epoxycyclohexylmethyl 3,4 - epoxycyclohexane carboxylic.

NIAX LG–240: The polypropylene oxide adduct of glycerol having a hydroxyl number of 240.

NIAX D–540: Poly-epsilon-caprolactone diol having an average molecular weight of about 1250; prepared by reacting 10 moles of epsilon-caprolactone with one mole diethylene glycol initiator.

RD 66–3: A hydroxyl-terminated polyester diol having a molecular weight of about 1200; obtained by reacting three moles of adipic acid with four moles of

HO—CH$_2$—C(CH$_3$)$_2$COOCH$_2$C(CH$_3$)$_2$CH$_2$OH

HHPA: Hexahydrophthalic anhydride.
BDMA: Benzyldimethylamine.

All other components are as designated.

Compositions reported in the subsequent tables were made by weighing out the components, e.g., anhydride, polyepoxide, hydroxyl-terminated cyclic ester polymer etc., into beakers, warming to melt and dissolve the solids (in most cases only gentle heating on a steam bath being required), and cooling, followed by adding catalyst with thorough stirring. Clear plaques were made by weighing 25.0 g. of the catalyzed mix into a 2.25-inch diameter aluminum foil dish and curing 2 hours at 120° C. followed by 4 hours at 160° C. Filled plaques were made by weighing 40.0 g. of the blend of catalyzed mix with Alcoa C-331 hydrated alumina into the same size container and curing with the same curing cycle. (Where tensile data is reported, the procedure was essentially as described above, however larger cured plaques, approximately 10 inches by 8 inches by one-eighth inch, were obtained, and Type 1 tensile specimens ASTM D-638 were cut therefrom.)

EXAMPLE 1

TABLE 1

| Composition No | 1 | 2 | 3 |
|---|---|---|---|
| Component, weight, g.: | | | |
| ERL-4221 | 45 | 45 | 45 |
| NIAX LG-240 | 60 | | |
| NIAX D-540 | | 60 | |
| RD 66-3 | | | 60 |
| HHPA | 45 | 45 | 45 |
| BDMA | 1.0 | 1.0 | 1.0 |
| Flexibilizer content (S), percent | 40 | 40 | 40 |
| Anhydride/epoxide ratio ($R_1$) | 0.88 | 0.88 | 0.88 |
| Anhydride/hydroxyl ratio ($R_2$) | 1.14 | 3.00 | 2.9 |

Accelerated weather results* after—
1,000 hours:
 (1) Sample darkened and surface heavily chalked.
 (2) Sample darkened but no checking.
 (3) Sample darkened but no checking.
2,000 hours:
 (1) Severe darkening, severe crazing and bubbling of surface.
 (2) Darkening, no crazing.
 (3) Darkening, no crazing.
3,000 hours:
 (1) Bubbling had progressed almost through ⅛ inch sample.
 (2) Darkening, slight crazing only.
 (3) Darkening, slight crazing only.
5,000 hours:
 (1) Plaque was completely bubbled and eroded.
 (2) Some crazing and surface checking only.
 (3) Some crazing and surface checking only.

*ASTM-D-1499-64.

NOTE.—After 5,000 hours exposure, plaques (2) and (3) were still in much better condition than was plaque (1) after only 1,000 hours.

The foregoing data show that composition 2 (containing a hydroxyl-terminated cyclic ester polymer in accordance with our invention) and composition 3 (containing a hydroxyl-terminated polyester diol) were markedly superior to composition 1 in resistance to weathering.

EXAMPLE 2

TABLE II

| Composition No | 4 | 5 | 6 |
|---|---|---|---|
| Component, weight, g.: | | | |
| ERL-4221 | 44.2 | 44.6 | 56.6 |
| NIAX D-540 | 123.6 | | 113.8 |
| RD 66-3 | | 112.8 | |
| HHPA | 32.2 | 32.6 | 29.6 |
| Hydrated alumina | 300 | 300 | 300 |
| Stannous octoate | 1.5 | 1.5 | 1.5 |
| Flexibilizer content (S), percent | 61.8 | 61.4 | 56.9 |
| Anhydride/epoxide ratio ($R_1$) | 0.64 | 0.64 | 0.46 |
| Anhydride/hydroxy ratio ($R_2$) | 1.06 | 1.03 | 1.06 |
| Properties at −40° C.: | | | |
| Tensile strength (p.s.i.) (ASTM D-638) | 4,725 | 2,020 | 5,673 |
| Elongation, percent | 7.8 | 1.0 | 2.7 |

Example 2 illustrates the improvement in low temperature toughness which is afforded by the compositions of our invention. As shown in Table II, the tensile strengths of compositions 4 and 6, containing a hydroxyl-terminated cyclic ester polymer, were substantially higher than that of composition 5, wherein in lieu of such cyclic ester polymer there was instead employed a hydroxyl-terminated polyester diol.

EXAMPLE 3

TABLE III

| Composition No | 7 | 8 |
|---|---|---|
| Component, weight, g.: | | |
| ERL-4221 | 24.0 | 24.0 |
| NIAX D-540 | 12.0 | 12.0 |
| HHPA | 12.0 | 12.0 |
| Epsilon-caprolactone | 72.0 | 57.6 |
| Epsilon-methyl-epsilon-caprolactone | | 14.4 |
| Hydrated alumina | 180 | 180 |
| Stannous octoate | 1.2 | 1.2 |
| Flexibilizer content (S), percent | 70.0 | 70.0 |
| Anhydride/epoxide ratio ($R_1$) | 0.44 | 0.44 |
| Anhydride/hydroxyl ratio ($R_2$) | 4.06 | 4.06 |
| Tensile properties (ASTM D-638) at— | | |
| 23° C.: | | |
| Tensile strength (p.s.i.) | 445 | 340 |
| Elongation, percent | 29 | 31 |
| −20° C.: | | |
| Tensile strength (p.s.i.) | 1,240 | 690 |
| Elongation, percent | 56 | 69 |
| −40° C.: | | |
| Tensile strength (p.s.i.) | 2,540 | 2,230 |
| Elognation, percent | 23 | 43 |

In Example 3, composition 7 illustrates the flexibility that can be obtained by the addition of a lactone monomer, in this instance, epsilon-caprolactone, to the composition.

As also shown in Table III, the replacement of a portion of the epsilon-caprolactone with methyl substituted epsilon-caprolactone gives superior low temperature tensile elongation.

What is claimed is:

1. A curable composition which comprises a mixture of a polyepoxide, a polycarboxylic acid anhydride, and a hydroxyl-terminated linear polymer of a cyclic ester of the formula

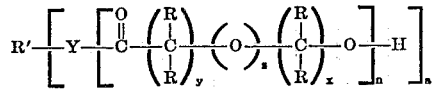

wherein R' is an aliphatic, cycloaliphatic, aromatic, or heterocyclic radical; Y is —O—, —S—, —NH—, or NR'', wherein R'' is an alkyl, aryl, aralkyl, or cycloalkyl radical; each R, individually, is hydrogen, alkyl, halogen, or alkoxy; $x$ and $y$ are each integers from 1 to 4; $z$ is either zero or 1; the sum of $x+y+z$ is not less than 4 and not greater than 6; the total number of R variables which are substituents other than hydrogen is not greater than 3; $a$ is at least 2; each $n$ is either zero or an integer, with at least one $n$ not being equal to zero; and the multiple of $a \cdot n$ is less than 100, said composition having a flexibilizer content from about 1 to about 80 percent by weight of the total organic content, an anhydride/epoxide ratio of from about 0.1 to about 1.5, and an anhydride/hydroxyl ratio of from about 0.5 to about 20.

2. The composition of claim 1 wherein the polyepoxide is a bis(epoxycyclohexyl) compound.

3. The composition of claim 2 wherein the polyepoxide is 3,4-epoxycyclohexylmethyl - 3,4 - epoxycyclo-hexanecarboxylate, bis(3,4-epoxycyclohexyl)adipate or 3,4-epoxy-6-methylcyclohexylmethyl - 3,4 - epoxy - 6-methylcyclohexanecarboxylate.

4. The composition of claim 3 additionally comprising a curing catalyst.

5. The composition of claim 4 wherein the curing catalyst is a metal halide Lewis acid, a tertiary amine, a fatty acid acrylate of a Group IV-B metal, an organotin compound having at least one Sn-C bond, or a carboxylic acid salt of lead or manganese.

6. The composition of claim 1 wherein the anhydride is phthalic anhydride, tetrahydrophthalic anhydride, hexahydrophthalic anhydride, chlorendic anhydride, glutaric anhydride, succinic anhydride, methyltetrahydrophthalic anhydride, adipic anhydride, maleic anhydride, or 1,2-naphthalic anhydride.

7. The composition of claim 2 wherein the hydroxyl-terminated cyclic ester polymer is of the formula

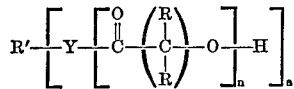

wherein each R is hydrogen or lower alkyl.

8. The composition of claim 7 wherein each R is hydrogen, Y is oxygen, and $a$ is 2.

9. The composition of claim 1, additionally comprising an inorganic filler.

10. The composition of claim 9 wherein the filler is hydrated alumina, hydrated magnesia, zircon, asbestos, mica, barytes, limestone, silica, or a metal silicate.

11. The composition of claim 9 wherein the filler is alumina trihydrate.

12. The composition of claim 9 wherein the filler is present in an amount from about 10 to about 80 percent by weight of the overall filled composition.

13. The composition of claim 1 additionally comprising a lactone selected from the group consisting of epsilon-caprolactone, epsilon-methyl-epsilon-caprolactone, zeta-enantholactone, eta-caprylolactone, 2-keto-1,4-dioxane, and mixtures thereof.

14. The composition of claim 13 wherein the lactone is epsilon-caprolactone.

15. The composition of claim 13 wherein the lactone comprises a mixture of a major proportion of epsilon-caprolactone and a minor proportion of epsilon-methyl-epsilon-caprolactone.

16. The composition of claim 1 wherein said flexibilizer content is from about 50 to 80 percent, said anhydride/epoxide ratio is from about 0.4 to 1.0, and said anhydride/hydroxyl ratio is from about 2 to 10.

17. The cured product of claim 1.

18. The cured product of claim 8.

References Cited

UNITED STATES PATENTS

| | | | |
|---|---|---|---|
| 3,203,920 | 8/1965 | Vikles et al. | 260—830 PX |
| 3,408,421 | 10/1968 | Kurka | 260—830 R |
| 3,117,099 | 1/1964 | Proops et al. | 260—2 Ep C |
| 3,169,945 | 2/1965 | Hastettler et al. | 260—78.3 |
| 3,222,312 | 12/1965 | Wyart et al. | 260—78.3 |
| 3,506,598 | 4/1970 | Graff et al. | 260—2 Ep C |

OTHER REFERENCES

Rose: Condensed Chemical Dictionary, 5th ed., Reinhold Publishing Corporation, New York (1956), p. 48.

MORRIS LIEBMAN, Primary Examiner

S. M. PERSON, Assistant Examiner

U.S. Cl. X.R.

260—32.8 EP, 37 EP, 830 R

UNITED STATES PATENT OFFICE
CERTIFICATE OF CORRECTION

Patent No. 3,699,070           Dated October 17, 1972

Inventor(s) J. Wynstra and J. J. Stevens Jr.

It is certified that error appears in the above-identified patent and that said Letters Patent are hereby corrected as shown below:

Column 1, line 67, "insualting" should read -- insulating --.

Column 2, line 21, "hydroen" should read -- hydrogen --.

Column 7, line 15, "2-(3-amino-" should read -- 2-(2-amino- --.

Column 11, Table II, under heading "5", line 60, "112.8" should read -- 122.8 --.

Column 13, line 10, Claim 7, in the middle of the formula,

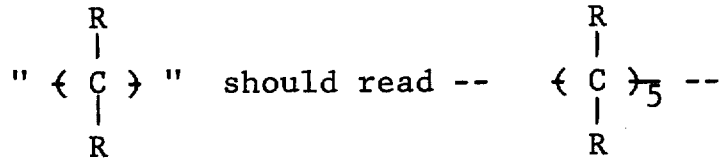

Signed and Sealed this

Fourth Day of October 1977

[SEAL]

Attest:

RUTH C. MASON          LUTRELLE F. PARKER
*Attesting Officer*      *Acting Commissioner of Patents and Trademarks*